United States Patent
Qin

(10) Patent No.: US 9,447,826 B2
(45) Date of Patent: *Sep. 20, 2016

(54) FRICTION CLUTCH FOR DRIVEN ACCESSORY

(71) Applicant: BorgWarner Inc., Auburn Hills, MI (US)

(72) Inventor: Shiwei Qin, Battle Creek, MI (US)

(73) Assignee: BorgWarner Inc., Auburn Hills, MI (US)

(*) Notice: Subject to any disclaimer, the term of this patent is extended or adjusted under 35 U.S.C. 154(b) by 140 days.

This patent is subject to a terminal disclaimer.

(21) Appl. No.: 14/149,664

(22) Filed: Jan. 7, 2014

(65) Prior Publication Data

US 2014/0174872 A1 Jun. 26, 2014

Related U.S. Application Data

(63) Continuation-in-part of application No. 14/135,280, filed on Dec. 19, 2013.

(60) Provisional application No. 61/745,647, filed on Dec. 24, 2012.

(51) Int. Cl.
*F16D 27/112* (2006.01)
*F16D 13/76* (2006.01)
*F01P 7/08* (2006.01)

(52) U.S. Cl.
CPC ............ *F16D 27/112* (2013.01); *F16D 13/76* (2013.01); *F01P 7/084* (2013.01); *F01P 2031/00* (2013.01)

(58) Field of Classification Search
CPC ................ F16D 27/112; F16D 13/76; F16D 2500/504; F16D 2500/5041
USPC ............................................... 192/90; 417/16
See application file for complete search history.

(56) References Cited

U.S. PATENT DOCUMENTS 2,991,864 A * 7/1961 Prachar .................. F16D 27/02
192/105 B
5,057,728 A * 10/1991 Dammeyer ......... B66F 9/07509
188/171

(Continued)

FOREIGN PATENT DOCUMENTS

CN 201721321 U 1/2011
CN 102085801 A 6/2011
WO WO-2012/142016 A2 10/2012

OTHER PUBLICATIONS

U.S. Appl. No. 14/135,280, filed Dec. 19, 2013.

(Continued)

*Primary Examiner* — Jacob S Scott
*Assistant Examiner* — Tinh Dang
(74) *Attorney, Agent, or Firm* — Harness, Dickey & Pierce, P.L.C.; John A. Artz PC

(57) ABSTRACT

A fail-safe friction clutch assembly for a vehicle accessory, particularly to drive a vehicle cooling pump or cooling fan. The friction clutch assembly includes a friction plate member connected to a central rotatable shaft member used for operating the vehicle accessory. A pair of friction lining members are positioned on opposite sides of the friction plate member. An armature member is spring biased to axially force the friction plate member and friction lining member against a housing or cover which is rotating at input speed. A solenoid assembly is used to overcome the spring bias and pull the armature and friction plate member away from the housing.

9 Claims, 5 Drawing Sheets

(56) References Cited

U.S. PATENT DOCUMENTS

| | | | |
|---|---|---|---|
| 5,295,812 A | 3/1994 | Steele | |
| 5,551,546 A | 9/1996 | Tabayama et al. | |
| 5,984,068 A | 11/1999 | Reed, Jr. | |
| 6,071,205 A | 6/2000 | Ohno et al. | |
| 6,119,841 A | 9/2000 | Orlamunder | |
| 6,488,133 B1 | 12/2002 | Maurice et al. | |
| 6,561,336 B1 * | 5/2003 | Huart | F02B 63/04 123/179.28 |
| 6,868,809 B1 | 3/2005 | Robb | |
| 6,974,010 B2 | 12/2005 | Machida et al. | |
| RE39,795 E | 8/2007 | Wright | |
| 7,267,214 B2 | 9/2007 | Bittner et al. | |
| 7,841,456 B2 | 11/2010 | Pescheck et al. | |
| 8,256,598 B2 | 9/2012 | Buzzard | |
| 8,371,426 B2 | 2/2013 | Hoshino et al. | |
| 8,678,152 B2 | 3/2014 | Kuwabara | |
| 8,851,258 B2 | 10/2014 | Komorowski et al. | |
| 8,978,600 B2 | 3/2015 | Shutty et al. | |
| 9,004,251 B2 | 4/2015 | Ikegawa | |
| 9,140,313 B2 | 9/2015 | Ikegawa | |
| 9,217,476 B2 | 12/2015 | Roby | |
| 9,279,460 B2 | 3/2016 | Qin | |
| 2002/0108588 A1 | 8/2002 | Komorowski | |
| 2003/0008741 A1 | 1/2003 | Fadler et al. | |
| 2003/0029392 A1 | 2/2003 | Komorowski | |
| 2003/0029393 A1 | 2/2003 | Komorowski | |
| 2007/0227853 A1 | 10/2007 | Pardee | |
| 2009/0047162 A1 | 2/2009 | Uchikado et al. | |
| 2009/0272615 A1 | 11/2009 | Buzzard | |
| 2010/0126822 A1 | 5/2010 | Winkler et al. | |
| 2012/0133465 A1 | 5/2012 | Staniewicz et al. | |
| 2013/0075219 A1 | 3/2013 | Onitake et al. | |
| 2013/0093547 A1 | 4/2013 | Staniewicz et al. | |
| 2013/0098730 A1 | 4/2013 | Danciu et al. | |
| 2013/0175134 A1 | 7/2013 | Boyes et al. | |
| 2013/0187736 A1 | 7/2013 | Staniewicz et al. | |
| 2013/0306005 A1 * | 11/2013 | Shutty | F01P 7/164 123/41.47 |
| 2013/0313068 A1 | 11/2013 | Mevissen et al. | |
| 2014/0023526 A1 | 1/2014 | Roby | |
| 2014/0076683 A1 | 3/2014 | Williams | |
| 2014/0141892 A1 | 5/2014 | Williams | |
| 2014/0174873 A1 | 6/2014 | Qin | |
| 2014/0174874 A1 | 6/2014 | Qin | |
| 2014/0238809 A1 | 8/2014 | Boyes et al. | |
| 2015/0075935 A1 | 3/2015 | Kitayama et al. | |
| 2015/0184575 A1 | 7/2015 | Shutty et al. | |
| 2015/0285365 A1 | 10/2015 | Canto Michelotti | |
| 2016/0004733 A1 | 1/2016 | Cao et al. | |

OTHER PUBLICATIONS

U.S. Appl. No. 14/149,683, filed Jan. 7, 2014, Qin.
U.S. Appl. No. 14/149,694, filed Jan. 7, 2014, Qin.
U.S. Appl. No. 14/149,713, filed Jan. 7, 2014, Qin.
U.S. Appl. No. 14/886,106, filed Oct. 19, 2015, Qin.

* cited by examiner

FRICTION CLUTCH FOR DRIVEN ACCESSORY

CROSS-REFERENCE TO RELATED APPLICATIONS

This application is a continuation-in-part of U.S. patent application Ser. No. 14/135,280 filed on Dec. 19, 2013, which claims the benefit of U.S. Provisional Patent Application Ser. No. 61/745,647, filed on Dec. 24, 2012.

TECHNICAL FIELD

Friction clutch drive assemblies, particularly for vehicle accessories such as coolant pumps, are disclosed.

BACKGROUND

Accessories such as water pumps and cooling fans are in common use in vehicles such as automobiles and trucks with internal combustion engines. The accessories are typically driven by a belt directly or indirectly attached to the crankshaft of the engine and thus operate at some percentage of engine speed. The water pumps have an impeller that is used to circulate the engine coolant from the engine to the radiator and back in order to keep the coolant within acceptable temperature limits. Cooling fans have a fan with blades that supplies atmosphere air to a radiator, for example, to cool the engine coolant.

Efforts are being made today to reduce the power consumption of engine accessories, such as water pumps and fan drives, in order to improve fuel economy and reduce emissions. It would thus be preferable if such accessories could be made to operate with less power, or only when needed, in order to reduce the load on the engine and, in turn, improve fuel economy and reduce undesirable emissions from the engine.

SUMMARY OF THE INVENTION

In one form, the present teachings provide a driven vehicle accessory that includes an input member, a housing, a first bearing, an electromagnetic coil, a cover, an armature, a friction plate, a plurality of coil springs and a return spring. The input member is configured to receive rotary power from an endless power transmission element and has a hub, an outer rim, and a radially extending web that couples the hub to the outer rim. The housing defines a bore, a tubular segment and an annular channel. The tubular segment is disposed radially between the bore and the annular channel. The tubular segment and the annular channel are concentric with the bore. The first bearing is received between the tubular segment and the hub of the input member and supports the input member for rotation relative to the housing. The electromagnetic coil is received in the annular channel and is disposed radially between the outer rim and the hub. The cover is coupled to the input member for common rotation about the axis. The cover cooperates with the input member to define a clutch cavity. The armature is received in the clutch cavity and is moveable along the axis between a first armature position and a second armature position. The friction plate is received in the clutch cavity and is capable of rotation about the axis relative to the armature. The friction plate is movable between a first friction plate position and a second friction plate position. The coil springs bias the armature relative to the friction plate in a first direction along the axis. The return spring is received between the cover and the friction plate and biases the friction plate toward the second friction plate position. The electromagnetic coil is selectively operable to generate a magnetic field to move the armature in a second, opposite direction along the axis.

Further objects, features and benefits of the invention are set forth below in the following description of the invention when viewed in combination with the drawings and appended claims.

BRIEF DESCRIPTION OF THE DRAWINGS

FIG. 2A is an exploded view of a portion of the assembly of FIG. 1.

DESCRIPTION OF THE PREFERRED EMBODIMENTS

Figure 1:
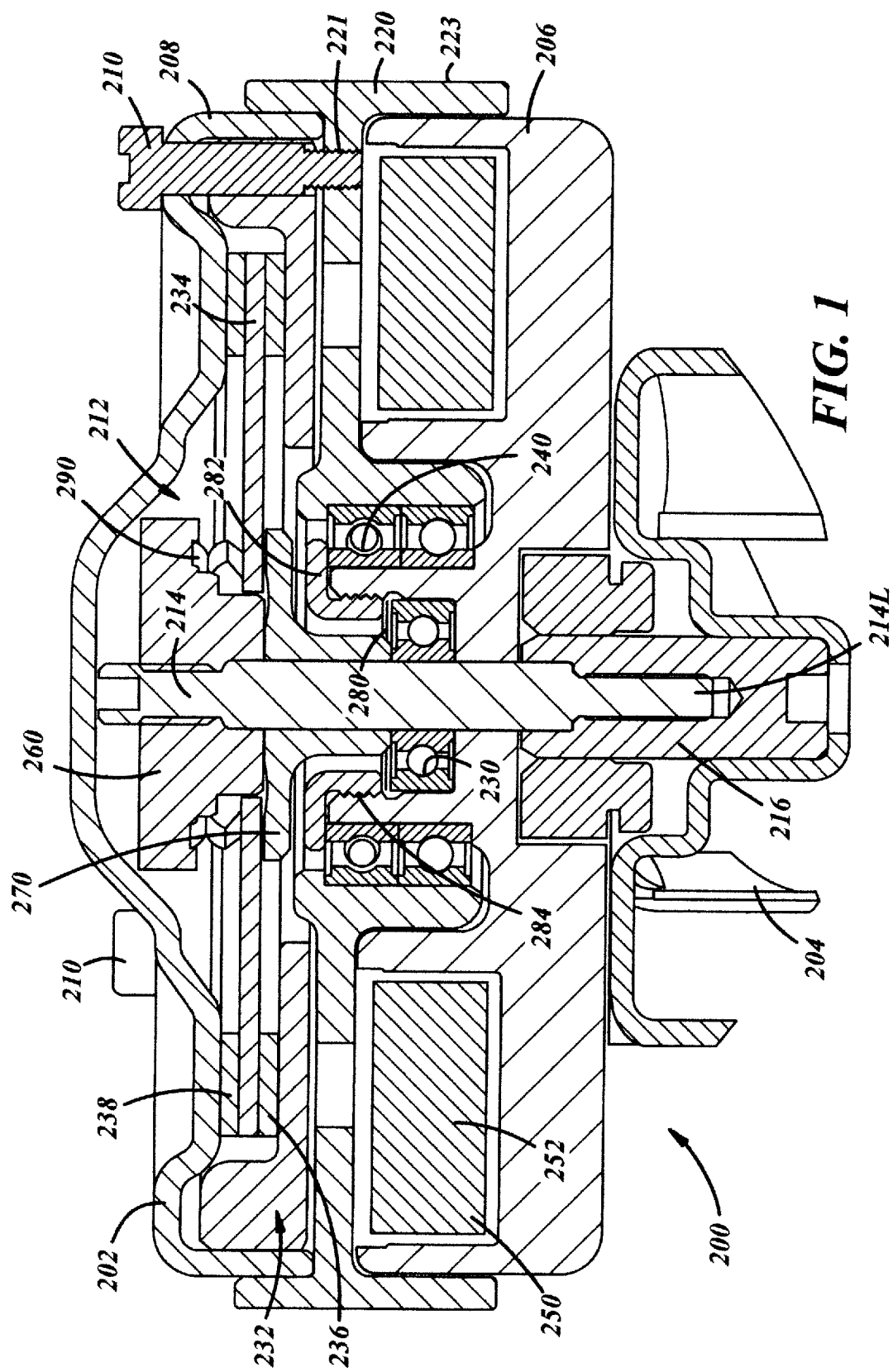
FIG. 1 is a cross-sectional view of a vehicle water pump assembly in accordance with an embodiment of the invention.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein particularly relate to friction clutch assemblies particularly used for coolant pumps and cooling fans. The coolant pumps circulate the coolant in an engine, such as an automobile internal combustion engine. (The terms "water pump" and "coolant pump" are used interchangeably herein.) The cooling fans are used to push or pull air through a radiator to help reduce the temperature of the engine coolant.

The preferred embodiments of the present invention as described herein are particularly adapted for use with trucks, passenger cars and off-highway vehicles.

An accessory assembly embodiment used to operate a cooling pump is shown in FIGS. 1-4. It is generally referred to by the reference numeral 200. The assembly includes a housing 202 and an impeller 204 which is used to circulate the engine cooling fluid in the vehicle.

The housing 202 includes a base member 206 and a cover member 208, which can be secured together by a plurality of fasteners, such as bolts 210. A solenoid actuated friction clutch mechanism 212 is positioned in the housing. A central shaft member 214 is positioned centrally in the housing and is used to rotate the impeller 204. The impeller is positioned in a housing (not shown) and is connected to the shaft member 214 by a fitting assembly 216. The lower end 214L of the shaft is secured to the assembly 216 in any conventional manner.

The assembled housing includes a pulley member 220. The pulley member is adapted to be driven by an engine belt, either directly or indirectly by the engine crankshaft. Although the outside surface 223 of the pulley member is smooth in the drawings, it can have any conventional shape in order to mesh or mate with the engine belt.

The shaft member 214 is rotatably supported in the housing 202 by bearing set member 230. Although only one bearing set 230 is shown, more than one sets of bearings or stacked bearings can be utilized.

The friction clutch mechanism 212 includes an armature plate 232, a friction plate 234 and two annular rings of friction material 236, 238. The armature plate 232 is preferably made of a magnetic metal material, such as low carbon steel. The friction plate 234 is preferably made of a non-magnetic material, such as stainless steel.

The friction material 236, 238 can be any conventional friction materials used in friction clutches today, and can be complete rings, segments of rings, or simply pieces of friction material positioned generally where rings 236, 238 are shown in the drawings. The friction materials are fixedly attached to the two sides of the friction plate by, for example, bonding using a bonding agent.

The cover member 208 which preferably is made of a non-magnetic material, such as stainless steel, is connected directly to the pulley member 220 by the connecting pin members, such as fasteners or bolts 210. The ends of the fasteners can be threaded for mating with corresponding mating threads in openings 221 in the pulley member 220. Thus, when the pulley is rotated by an engine belt (not shown); the cover member 208 rotates at the same input speed.

The pulley member 220 is preferably made of a magnetic metal material, such as low carbon steel. The pulley member rotates freely around bearings 240. Although the bearings can be of any type that will have sufficient durability and performance, a pair of stacked bearings 240 can be utilized, as shown in the drawings.

The operation of the friction clutch assembly is performed by a solenoid assembly 250. The solenoid assembly includes a solenoid coil 252 which is positioned in the base member 206 of the housing 202. The solenoid coil member comprises a donut-shaped coil of copper wires, while the solenoid housing is preferably made of a magnetic material, such as low carbon steel. The solenoid coil member 252 is preferably potted in the housing member 206.

Figure 2:
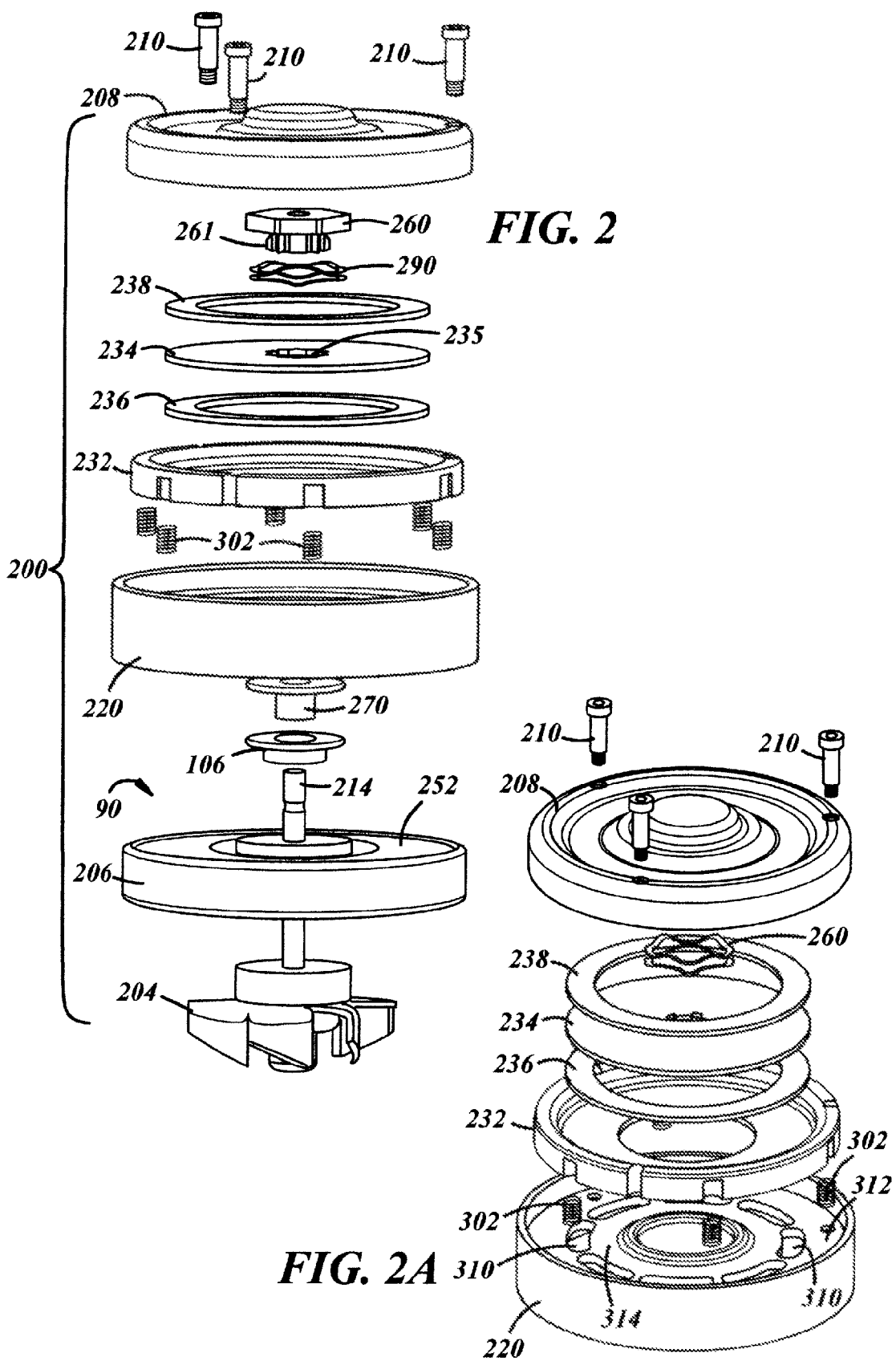
FIG. 2 is an exploded view of the assembly of FIG. 1.

A nut member 260 is threaded, or otherwise firmly fixed, on the end of the shaft member 214. The friction plate member 234 is connected, such as being keyed, to the nut member 260. As shown in FIG. 2, the nut member has a plurality of spline members 261 which fit within corresponding notches 235 in the center of the friction plate member 234. In this manner, the nut and friction plate members rotate with the shaft member 214. The nut member 260 and the shaft member 214 firmly clamp a stop member 270 and the bearing member 230 together. The shaft member 214 and all components fixed on it are positioned axially by the bearing member 230. The stop member 270 is preferably made of a non-metallic material, such as stainless steel.

To fix the bearing member 230 in an axial position inside the housing 206, a wave spring member 280 and bearing retainer member 282 are utilized. The bearing retainer member 282 is threadedly affixed to the housing 206 as shown by reference number 284.

The stop member 270 is utilized to stop the axial movement of the friction plate member 234 when the solenoid assembly 250 is energized, as explained below. A return spring 290 is positioned between the nut member 260 and the friction plate member 234 and acts to return the friction plate member 234 to its mechanical disengaged position when the solenoid assembly 250 is actuated.

The solenoid coil 252 is electrically powered through a circuit board (not shown). Electrical leads and wires can be insert molded in the housing 206 in order to carry the electrical signals to the solenoid coil member 252. The circuit board further communicates with the electronic control unit (ECU) of the vehicle through the vehicle communication network such as a CAN network. The water pump assembly controller circuit board could also be positioned inside the housing 206, possibly having a donut shape.

Activation of the water pump is selected according to the cooling required for the engine. Sensors feed relevant data to the ECU which then sends a signal to the pump controller requesting that the pump be activated. The pump controller then engages the friction clutch which allows the impeller to be driven by the pulley.

Figure 4:
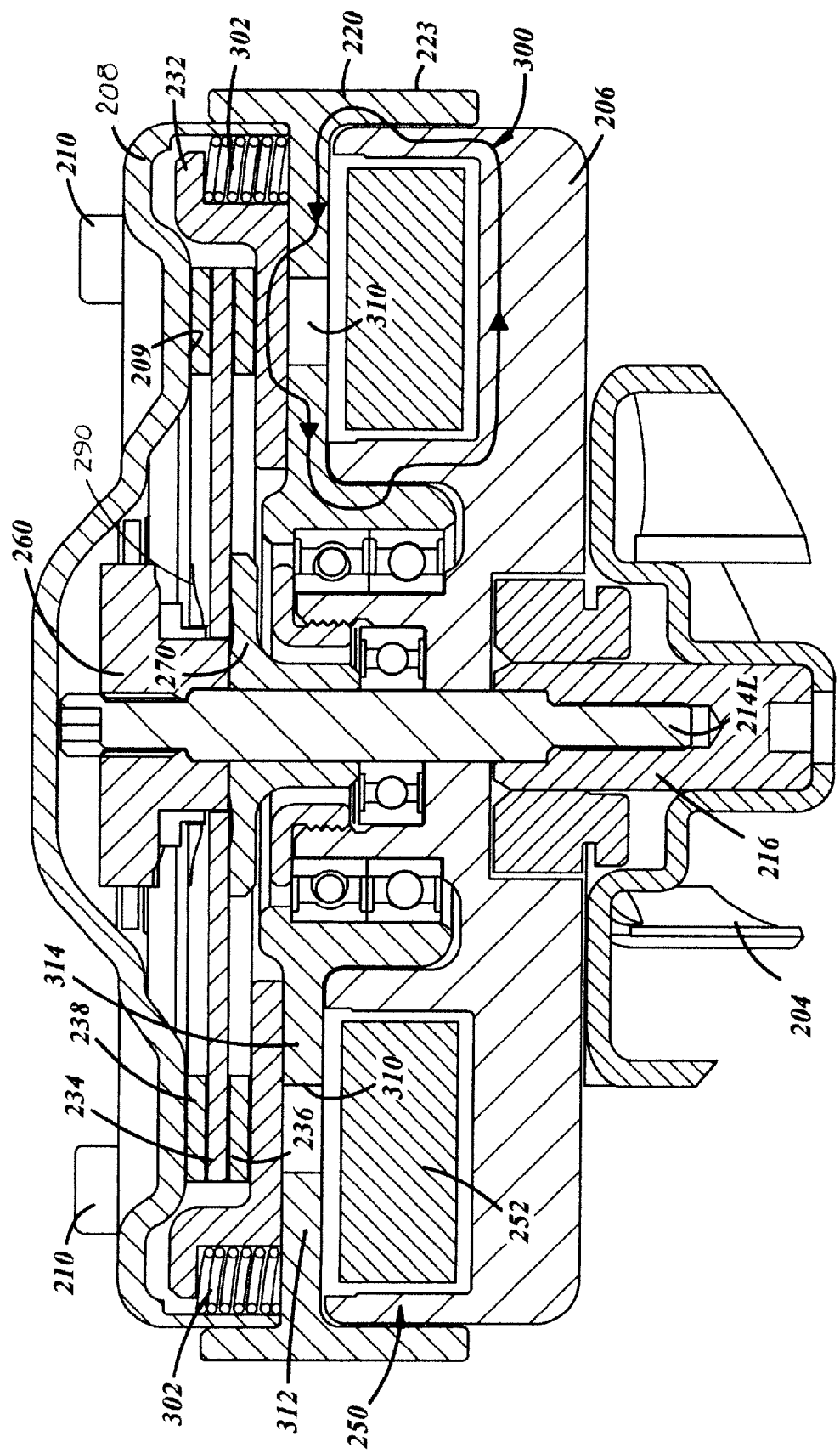
FIG. 4 is a cross-sectional view of the assembly shown in FIGS. 1 and 2 with the components shown in the solenoid engaged position.

When activation of the water pump is not needed, the friction clutch assembly is held in a disengaged position by the solenoid assembly 250. This is shown in FIG. 4. When the solenoid coil member 252 is electrically activated, a flux circuit 300 is created which acts to pull the armature plate 232 toward the solenoid coil member overcoming the force of the coil spring members 302. With the armature plate 232 pulled toward the solenoid, the return spring 290 holds the friction plate 234 against the stop member 270. In this condition, the friction materials on the friction plate 234 are not in contact with either the cover member 208 or the armature plate 232.

The number of coil springs 302 and their biasing force is determined according to the force needed in the assembly. Six coil springs 302 are shown in the drawings, but there can be more or less than this amount depending on the force needed.

In this deactivation mode of operation, there are air gaps on the exterior sides of the friction materials on the friction plate, and the input (pulley member) and output (shaft member) are disconnected. This eliminates any interaction, such as bearing drag between the input and output.

In order to create an appropriate flux circuit 300, the pulley member 220 has a plurality of openings 310 which create air gaps. This is particularly shown in FIG. 2A, as well as FIG. 4. The openings 310 essentially form an annular open ring. With the air gaps, the pulley member is, for electromagnetic purposes, essentially an outer annular ring 312 and a separated annular inner ring 314. The size, shape and number of openings or slots 310 is not critical, so long as they fulfill the purposes of creating a break in the magnetic flux.

The flux circuit 300 is shown in FIG. 4. It runs through the solenoid housing 206, the belt engaging portion 223 of the pulley member 220, outer annular ring portion 312 of the pulley member, and then jumps to the armature plate member 232 and then back to the inner annular ring portion 314 of the pulley member 220 where it returns to the solenoid housing. This circuit pulls the armature member tightly against the pulley member such that the armature member rotates with the pulley member and at the same speed. In this condition, the water pump impeller 204 is not activated.

Figure 3:
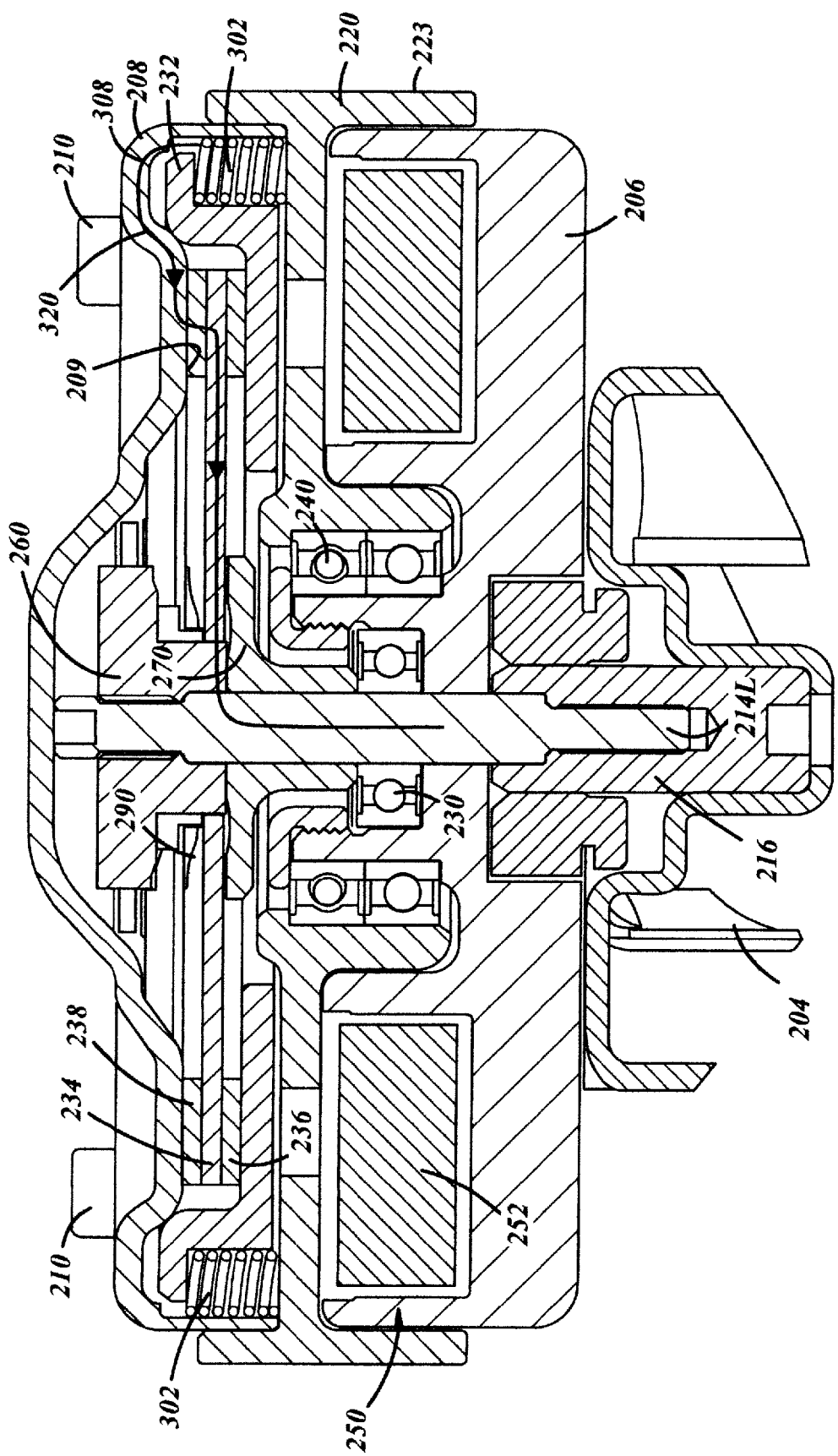
FIG. 3 is a cross-sectional view of the assembly shown in FIGS. 1 and 2 with the components shown in the solenoid disengaged position.

FIG. 3 depicts the situation where the solenoid assembly 250 is not activated. This is the "fail safe" condition. This causes the water pump to be driven by an engine belt and activated. In this situation, coil springs 302 force the armature member 232 in a direction away from the pulley member and away from the solenoid assembly. This causes the armature member 232 to contact the friction member 236 which in turn forces the friction member 238 to contact the inner surface 209 of the cover member 208. Since the armature member, pulley member and cover member are all fixed together, this causes the shaft member 214 and impeller member 204 to rotate at the same speed.

A path of torque transfer which mechanically rotates the shaft member is shown by arrows 320 in FIG. 3. In the engaged clutch, the friction plate member 234 is clamped between the cover member 208 and armature member 232 and torque is transferred through both sides of the friction plate. There also is a torque transfer path from the pulley member 220, through the fastener 210, the armature plate member 232, the friction plate member 234, the nut member 290 and to the shaft 214.

Figure 5:
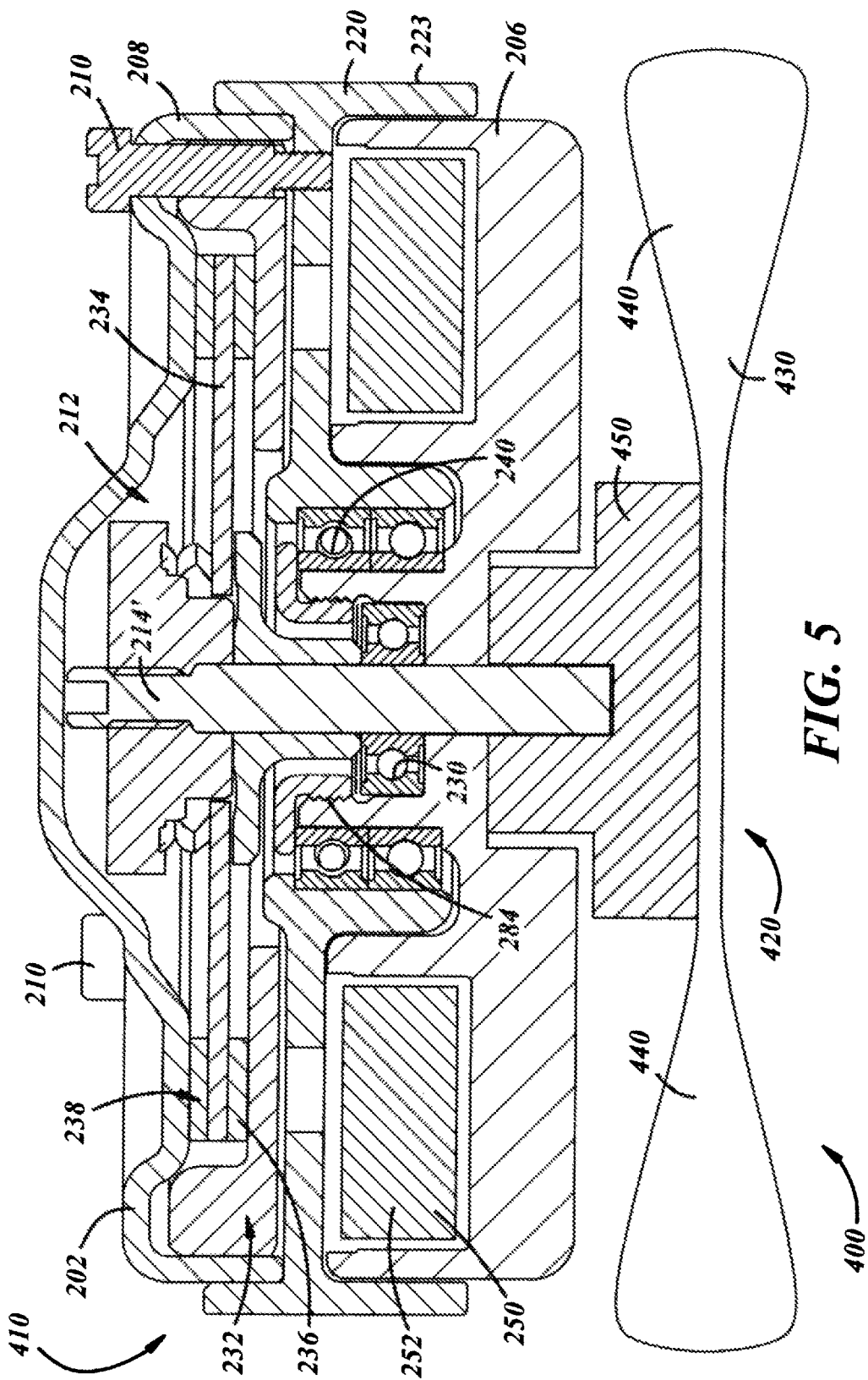
FIG. 5 is a cross-sectional view of a vehicle cooling fan assembly in accordance with another embodiment of the invention.

FIG. 5 schematically depicts the use of the inventive friction clutch for operating a cooling fan. The cooling fan accessory mechanism is referred to generally by the reference numeral 400.

The friction clutch mechanism 410 is substantially the same as the friction clutch mechanism described above which is utilized to selectively rotate a water pump impeller. In this embodiment, the friction clutch mechanism is utilized to rotate a cooling fan. The components which are the same are referred to by the same reference numerals as set forth in the other Figures. The main differences are that the shaft member 214', when activated, rotates a cooling fan assembly 420. The fan assembly 420 includes a cooling fan 430 with a number of blade members 440 and central hub member 450. The hub member 450 is securely attached to the shaft member 214', and the fan 430 is securely attached to the hub member 450, such that the housing fan and blades will rotate when the shaft member rotates and at the same speed. Any conventional means or mechanisms can be utilized to attach the components together so they all rotate together.

The present water pump and cooling fan devices are designed to be spring engaged so the accessory device is powered in the event of a control failure such as a loss of electrical power. This is done to provide "Fail-Safe" functionality meaning that the device defaults to its "on" state when it is not powered. If the electrical system of the coolant pump were to fail, the solenoid would be de-energized allowing the coil springs to force the friction clutch assembly to become engaged. Therefore the pump would operate in mechanical mode with the impeller driven by the pulley member through the clutch assembly, thus preventing overheating.

Although the invention has been described with respect to preferred embodiments, it is to be also understood that it is not to be so limited since changes and modifications can be made therein which are within the full scope of this invention as detailed by the following claims.

What is claimed is:

1. A driven vehicle accessory comprising:
an input member adapted to receive rotary power from an endless power transmission element, the input member having a hub, an outer rim, and a radially extending web that couples the hub to the outer rim;
a housing that defines a bore, a tubular segment and an annular channel, the tubular segment being disposed radially between the bore and the annular channel, the tubular segment and the annular channel being concentric with the bore;
a first bearing received between the tubular segment and the hub of the input member, the first bearing supporting the input member for rotation relative to the housing;
an electromagnetic coil received in the annular channel, the electromagnetic coil being disposed radially between the outer rim and the hub;
a cover coupled to the input member for common rotation about the axis, the cover cooperating with the input member to define a clutch cavity;
an armature received in the clutch cavity, the armature being disposed on a side of the web opposite the electromagnetic coil, the armature being moveable along the axis between a first armature position and a second armature position;
a friction plate received in the clutch cavity and capable of rotation about the axis relative to the armature, the friction plate being movable between a first friction plate position and a second friction plate position;
a plurality of coil springs biasing the armature relative to the friction plate in a first direction along the axis;
a return spring received between the cover and the friction plate, the return spring biasing the friction plate toward the second friction plate position;
wherein the electromagnetic coil is selectively operable to generate a magnetic field to move the armature in a second direction along the axis, the second direction being opposite the first direction.

2. The vehicle accessory of claim 1, further comprising a shaft that is coupled to the friction plate for common rotation, the shaft being received through the bore.

3. The vehicle accessory of claim 2, further comprising a second bearing received in the tubular segment and supporting the shaft for rotation about the axis.

4. The vehicle accessory of claim 2, wherein the friction plate is movable along the axis relative to the shaft.

5. The vehicle accessory of claim 2, further comprising an axial flow fan coupled to the shaft for rotation therewith.

6. The vehicle accessory of claim 2, further comprising an impeller coupled to the shaft for rotation therewith.

7. The vehicle accessory of claim 1, wherein the plurality of coil springs are disposed between the input member and the armature.

8. The vehicle accessory of claim 7, wherein the plurality of coil springs are in-line with the web of the input member.

9. The vehicle accessory of claim 1, wherein the outer rim is configured to engage a belt.

* * * * *